United States Patent
Spasov

(10) Patent No.: US 10,782,976 B2
(45) Date of Patent: Sep. 22, 2020

(54) ISSUING AND FLUSHING INSTRUCTIONS FROM RESERVATION STATIONS USING WRAP BITS AND INDEXES

(71) Applicant: Dejan Spasov, Skopje (MK)

(72) Inventor: Dejan Spasov, Skopje (MK)

( * ) Notice: Subject to any disclaimer, the term of this patent is extended or adjusted under 35 U.S.C. 154(b) by 47 days.

(21) Appl. No.: 16/361,254

(22) Filed: Mar. 22, 2019

(65) Prior Publication Data
US 2019/0339979 A1 Nov. 7, 2019

Related U.S. Application Data

(60) Provisional application No. 62/667,639, filed on May 7, 2018.

(51) Int. Cl.
*G06F 9/38* (2018.01)

(52) U.S. Cl.
CPC .......... *G06F 9/3855* (2013.01); *G06F 9/3842* (2013.01); *G06F 9/3853* (2013.01); *G06F 9/3836* (2013.01); *G06F 9/3859* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 5,584,037 A | 12/1996 | Papworth et al. | |
| 5,584,038 A * | 12/1996 | Papworth | G06F 5/14 711/110 |
| 5,887,161 A * | 3/1999 | Cheong | G06F 9/3836 712/228 |
| 5,913,048 A * | 6/1999 | Cheong | G06F 9/3836 712/215 |
| 6,098,167 A * | 8/2000 | Cheong | G06F 9/3863 712/217 |
| 7,711,935 B2 | 5/2010 | Singh et al. | |
| 8,099,586 B2 | 1/2012 | Chou et al. | |
| 8,245,018 B2 | 8/2012 | Nguyen | |
| 8,489,863 B2 | 7/2013 | Bishop et al. | |
| 9,367,322 B1 | 6/2016 | Brownscheidle et al. | |
| 9,489,207 B2 | 11/2016 | Burky et al. | |
| 9,569,222 B2 | 2/2017 | Guo et al. | |
| 9,825,647 B1 * | 11/2017 | Satpathy | H03M 7/3082 |
| 10,095,525 B2 | 10/2018 | Spasov | |

(Continued)

*Primary Examiner* — Kenny S Lin

(57) ABSTRACT

A processor may include reservation stations to host instructions waiting to be issued to the execution units. Instructions in reservation stations comprise wrap bits and indexes, assigned by modulo counters. If wrap bits of two instructions are equal, then instruction with smaller index is older. If wrap bits of two instructions are different, then instruction with larger index is older. Responsive to exception event, wrap bit and index of an instruction executed with exception is compared with wrap bits and indexes of instructions in reservation stations to determine relative age. Instructions younger than the instruction executed with exception may be flushed from the reservation stations. Instructions in reservation stations may be grouped in pairs. In each pair, older ready instruction is selected using ready-to-issue bits, wrap bits, and indexes. Grouping and selecting instructions is repeated until one instruction remains. The remaining instruction is referred to as the oldest ready instruction.

24 Claims, 8 Drawing Sheets

(56) References Cited

U.S. PATENT DOCUMENTS

| | | |
|---|---|---|
| 10,120,690 B1 | 11/2018 | Srinivasa et al. |
| 2008/0077781 A1* | 3/2008 | Smith .................. G06F 9/3861 <br> 712/239 |
| 2010/0169622 A1* | 7/2010 | Nguyen ................ G06F 9/3844 <br> 712/228 |
| 2013/0125097 A1* | 5/2013 | Ebcioglu ........... G06F 15/17381 <br> 717/136 |
| 2016/0357554 A1* | 12/2016 | Caulfield .............. G06F 9/3836 |
| 2017/0024205 A1 | 1/2017 | Kountanis et al. |
| 2019/0087197 A1 | 3/2019 | Spasov |

\* cited by examiner

ISSUING AND FLUSHING INSTRUCTIONS FROM RESERVATION STATIONS USING WRAP BITS AND INDEXES

BACKGROUND

Field of the Invention

The present invention relates to processors, and more particularly, to efficiently perform age-related operations, like issuing the oldest ready instruction, and flushing instructions younger than an instruction executed with exception.

Related Applications

This application claims priority to U.S. Provisional Patent Application No. 62/667,639 filed on May 7, 2018.

DESCRIPTION OF THE RELATED ART

Modern processor microarchitectures implement multi-threading and out-of-order execution to improve instructions per cycle (IPC) rate. Instructions may be waiting for execution in one or more reservation stations. In one embodiment, reservation stations may be implemented as shifting FIFO-like structures, where instructions enter at one end of a queue, while the search for the oldest ready instruction starts at the other end. The position of an instruction with respect to the exiting end of the queue is indicator of the relative age of the instruction. This approach simplifies the search for the oldest ready instruction. However, a constant shift of instructions is needed in order to make space for new instructions. Shifting instructions in a reservation station is very expensive operation in terms of gates, die area, wiring, and power consumption.

In another embodiment, reservation stations may be implemented as non-shifting structures, where instructions are kept in one entry until their issuance to the execution units. In one embodiment, oldest ready instructions may be tracked with an age matrix. Each row in the age matrix is associated with an instruction hosted in the reservation station. The number of logical 1s (or 0s) in a row represents relative age of an instruction. For an n-entry reservation station, maintaining an age matrix of size n×n may be a very expensive in terms of gates, die area, wiring, and power consumption. In another embodiment, relative age may be tracked with age tags, assigned to instructions when they enter the reservation stations. The smaller an age tag of an instruction is, the older the instruction is. When an instruction is issued, age tags of younger instructions are decremented. Maintaining circuitry for decrementing age tags may be very expensive in terms of gates, die area, wiring, and power consumption.

Modern processor microarchitectures implement branch prediction and speculative fetch of instructions from the predicted branch. On misprediction, speculatively fetched instructions need to be flushed from the processor. Responsive to exception event, reservation stations may be configured to flush instructions younger than an instruction executed with exception, while leaving older instructions to finish execution. Flushing instructions from the reservation stations may be implemented by maintaining a flush mask for each instruction. Each bit in a flush mask indicates dependence between an instruction and older instruction that may flush the instruction. This approach leads to complex design solutions that do not scale well with the size of the flush mask. Keeping the flush mask as small as possible, on the other hand, introduces stalls at runtime. Moreover, the number and the type of instructions (e.g. branches) that may initiate flush operation is predetermined at the design stage of the processor.

SUMMARY

The invention discloses method and apparatus for issuing oldest ready instructions from reservation stations, and method and apparatus for flushing instructions younger than an instruction executed with exception. Embodiments described herein use wrap bits and indexes to determine relative age between instructions. Embodiments for determining relative age based on wrap bits and indexes do not need large matrices to keep a track of the relative age among instructions. Moreover, any instruction of any type that is executed with exception may initiate flush operation on younger instructions, not only at-design-stage predetermined type and number of instructions.

In various embodiments, a processor may include one or more reservation stations configured to host instructions waiting to be issued to the execution units. The processor may include one or more modulo counters configured to assign integers to instructions entering the reservation stations. In one embodiment, the interval of assigned integers may be, at least, twice as large as the max number of in-flight instructions that may be in the processor. The most significant bit of assigned integers may be referred to as wrap bit, while the remaining bits may be referred to as index. Given two instructions from one thread, instruction that precedes in program order may be referred to as older. Given two instructions from different threads, instruction that entered the reservation stations first may be referred to as older. In an embodiment where modulo counters assign integers in increasing fashion, if wrap bits of two instructions are equal, then instruction with smaller index is older, but if wrap bits of the instructions are different, then instruction with larger index is older. In an embodiment where modulo counters assign integers in decreasing fashion, if wrap bits of two instructions are equal, then instruction with larger index is older, but if wrap bits of the instructions are different, then instruction with smaller index is older.

The processor may include issue logic coupled to the reservation stations. The issue logic may be configured to issue oldest ready instruction to execution units. Given two instructions, older ready instruction is the older instruction, with precedence given to ready-to-be-issued instructions. The issue logic may be configured to repeatedly select older ready instructions from pairs of instructions until one instruction remains. The remaining instruction is referred to as oldest ready. Reservation stations may be configured to issue oldest ready instructions.

The processor may include flush logic coupled to the reservation stations. Responsive to exception event, the flush logic may be configured to flush instructions from the reservation stations that are younger than an instruction executed with exception. The flush logic may use wrap bits and indexes to determine relative age between each instruction and the instruction executed with exception. Instructions younger than the instruction executed with exception may be flushed from reservation stations.

DETAILED DESCRIPTION

Figure 1:
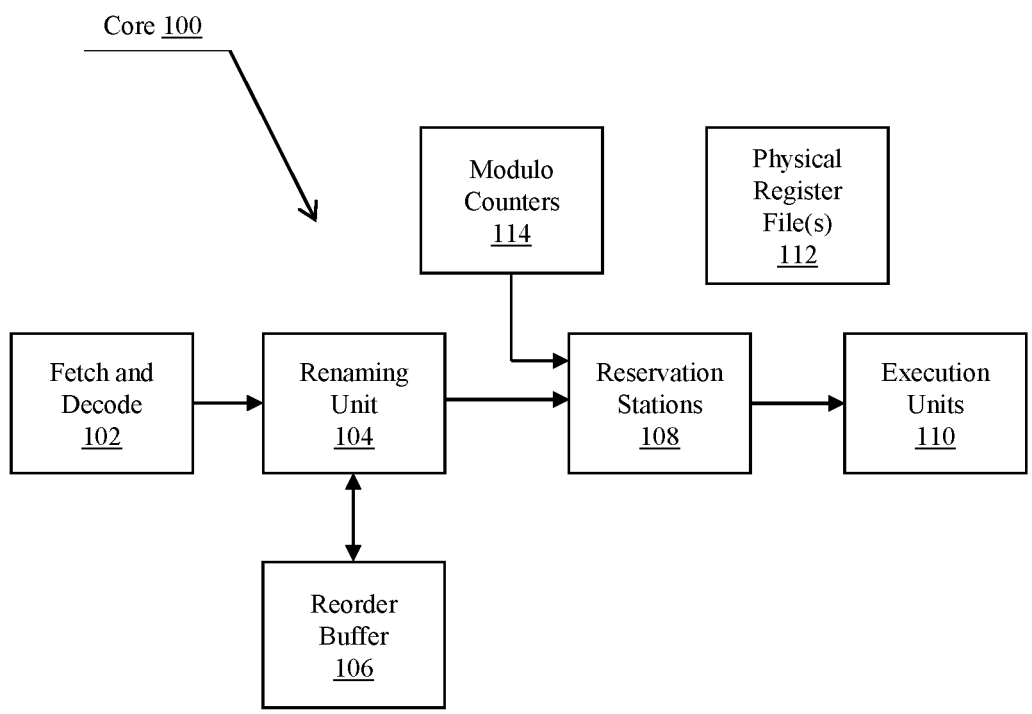
FIG. 1 shows microarchitecture of a core processor.

FIG. 1 shows microarchitecture of a core processor. The core 100 may include fetch and decode unit 102, renaming unit 104, reorder buffer 106, reservation stations 108, execution units 110, physical register file 112, one or more modulo counters (or modulo address generators) 114, and other components and interfaces not shown on FIG. 1 to emphasize embodiments described herein. The core 100 may support multiple instruction issue, out-of-order execution, and multi-threading, wherein plurality of threads may simultaneously be processed, or plurality of threads may time-share the core 100, or combination thereof.

The fetch and decode unit 102 may be configured to fetch instructions from memory or cache and to output, in parallel, one or more decoded instructions or instruction (micro-) operations. The fetch and decode unit 102 may be configured to fetch instructions from any instruction set architecture, e.g. PowerPC™, ARM™, SPARC™, x86™, etc., and to output instructions that may be executed in the execution units 110. In other microarchitectures, the fetch and decode unit 102 unit may be represented with two or more units, e.g. fetch unit, decode unit, branch predictor, L1 cache, etc., not shown on FIG. 1 to emphasize embodiments described herein.

The renaming unit 104 may be configured to rename instructions' source and destination operands to physical registers of the core 100. Physical registers of the core 100 may be organized in one or more physical register files 112 configured to store speculative results and architecturally visible results.

The core 100 may include a reorder buffer 106 configured to maintain in-order retirement of the instructions. Instructions enter at one end of the buffer and retire at the other end. In one embodiment, allocated reorder buffer entries may be organized as circular buffer, where adjacent, in program order, instructions allocate entries with adjacent addresses. In another embodiment, allocated reorder buffer entries may be organized as linked list, where adjacent instructions may allocate nonadjacent entries connected with pointers.

The core 100 may include one or more modulo counters 114 configured to assign integers to instructions entering the reservation stations 108. In one embodiment, integers may be assigned in wrapped-around increasing fashion following the order of instructions entering the reservation stations 108. The order of instructions from one thread that enter reservation stations 108 corresponds to the program order of the instructions. In another embodiment, integers may be assigned in wrapped-around decreasing fashion. In a multi-threaded microarchitecture 100, one thread-specific modulo counter 114 may be included for each thread, which may be configured to assign integers to instructions in the thread. In one embodiment, modulo counters 114 may be configured to assign $\lceil \log_2 (2N) \rceil$-bit integers, where N is the size of the instruction window, i.e. the max number of in-flight instructions that may be in the core 100. The most significant bit of the assigned integers may be referred to as wrap bit W, while the remaining bits may be referred to as index I. In one embodiment, indexes I assigned by the modulo counters 114 may correspond to indexes of reorder buffer entries allocated to the instructions. In other words, modulo counters 114 may be part of the allocator circuits of the reorder buffer 106.

The core 100 may include one or more reservation stations 108, each coupled to one or more execution units 110. Reservation stations 108 may be hosting instructions waiting to be issued to the execution units 110. An instruction may be waiting for source operands to become ready, designated execution unit to become available, through-memory data dependencies to be resolved, etc. Reservation stations 108 may be coupled to an issue logic, which may be configured to issue oldest ready instructions to the execution units 110.

Execution units 110 may include any number and type of execution units, e.g. integer unit, floating point unit, load/store unit, branch unit, etc., configured to execute instructions. An instruction may be executed with exception. Reservation stations 108 may be coupled to a flush logic that may be configured to flush instructions younger than the instruction executed with exception, while leaving older instructions to finish execution.

Figure 2:
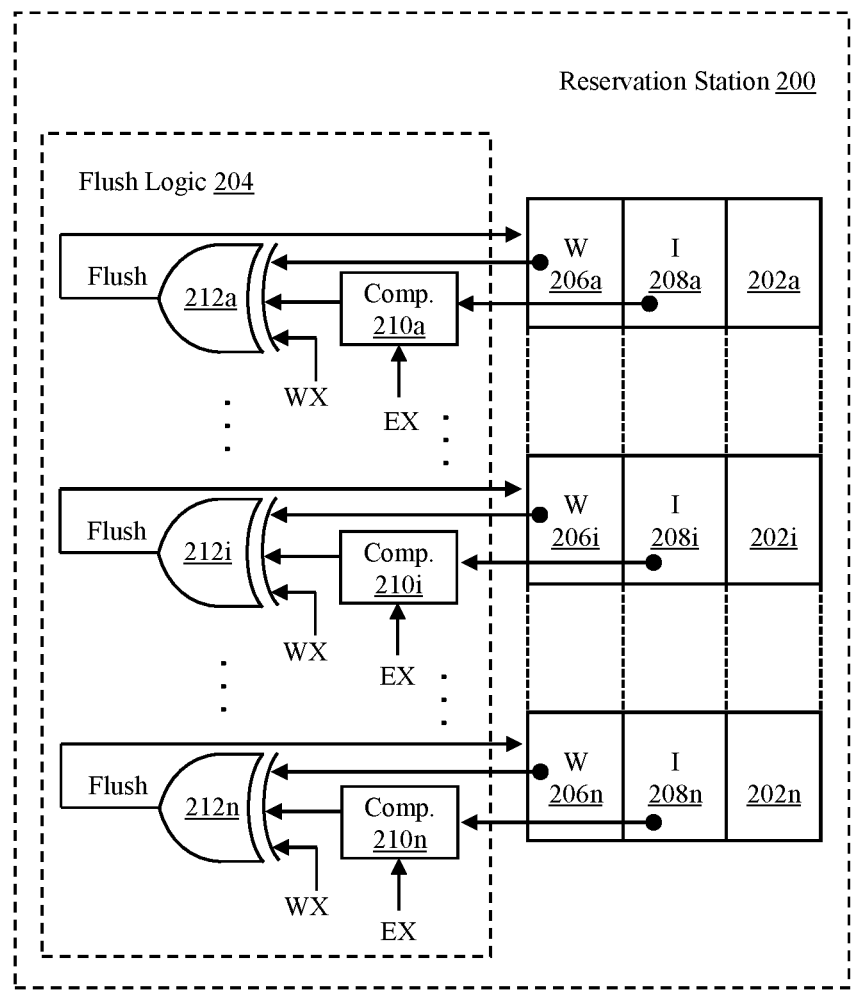
FIG. 2 shows an embodiment of flush logic.

Turning now to FIG. 2, an embodiment of flush logic is shown. A reservation station 200 comprising plurality of entries 202a-n is coupled to a flush logic 204. In response to exception event, the flush logic 204 is configured to selectively flush instructions from the reservation station 200. Reservation station entries 202a-n host instructions comprising wrap bit W 206a-n and index I 208a-n. In one embodiment, wrap bits W 206a-n and indexes I 208a-n may be assigned by a modulo counter 114. In another embodiment, wrap bits W 206a-n and indexes I 208a-n may be assigned by plurality of thread-specific modulo counters 114. The one or more modulo counters 114 may be assigning B-bit integers to instructions, where B≥$\lceil \log_2 (2N) \rceil$, where N is the size of the instruction window. In one embodiment, assigned indexes I 208a-n may correspond to indexes of reorder buffer 106 entries allocated to the instructions.

Given two instructions from one thread, instruction that precedes in program order is considered older. In an embodiment where integers are assigned in increasing fashion, if wrap bits of two instructions are equal, then instruction with smaller index is older, but if wrap bits of the two instructions are different, then instruction with larger index is older. Responsive to exception event, e.g. branch misprediction, cache miss etc., a wrap bit WX and an index EX of an instruction executed with exception may be provided to the flush logic 204. The flush logic 204 may be configured to compare indexes I 208a-n with the index EX, and to flush each instruction with wrap bit W 206a-n equal to WX and index I 208a-n larger than EX, and each instruction with wrap bit W 206a-n not equal to WX and index I 208a-n smaller than EX.

In an embodiment where integers are assigned in decreasing fashion, if wrap bits of two instructions are equal, then instruction with larger index is older, but if wrap bits of the two instructions are different, then instruction with smaller index is older. The flush logic 204 may be configured to flush each instruction with wrap bit W 206a-n equal to WX and index I 208a-n smaller than EX, and each instruction with wrap bit W 206a-n not equal to WX and index I 208a-n larger than EX.

In one embodiment, the flush logic 204 may include comparators 210a-n and XOR gates 212a-n. Those of ordinary skill in the art will appreciate that the hardware may vary depending on the implementation. Comparators 210a-n may be configured to compare indexes I 208a-n with the index EX. In an embodiment where integers are assigned in increasing fashion, a comparator 210i, coupled to an entry 202i, may be configured to output logical 1 if EX<I 208i, or 0 otherwise. In an embodiment where integers are assigned in decreasing fashion, a comparator 210i, coupled to an entry 202i, may be configured to output logical 1 if I<EX 208i, or 0 otherwise. XOR gates 212a-n are coupled to receive the wrap bit WX, wrap bits 206a-n, and output from comparators 210a-n, and to output flush signals which may initiate flush operation on the coupled entries. An XOR gate 212I, coupled to receive a wrap bit 206i and output from a comparator 210i, which is configured to compare I 208i with EX, may assert a flush signal to indicate that the instruction executed with exception is older than the instruction hosted in the entry 202i. In a single-threaded core 100, if the instruction executed with exception is older than an instruction hosted in the entry 202i, then asserted flush signal may flush the instruction hosted in the entry 202i. In a multi-threaded core 100, an instruction, younger than an instruction executed with exception, may be flushed from the entry 202i only if the instruction and the instruction executed with exception are in one thread.

Figure 3:
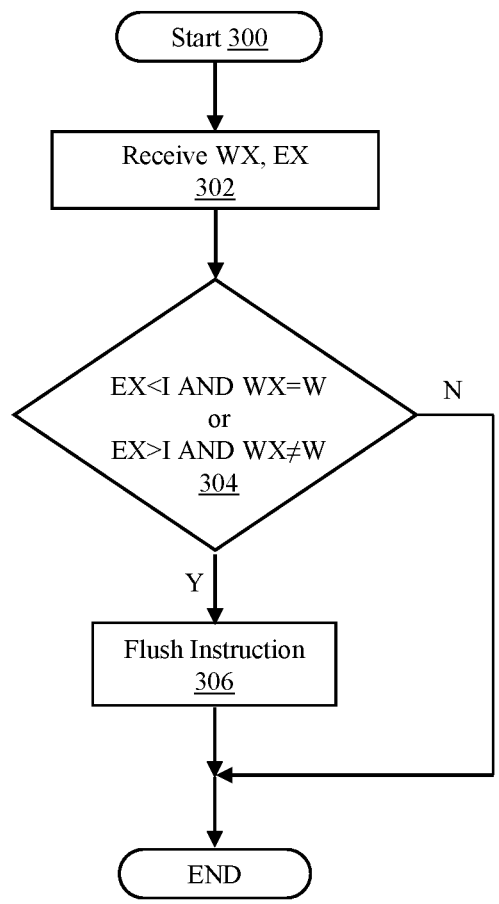
FIG. 3 shows a method for selectively flushing instructions.

Turning now to FIG. 3, a method for selectively flushing instructions is shown. The method for selectively flushing instructions 300 begins when it receives a wrap bit WX and an index EX of an instruction executed with exception (block 302).

Index I and wrap bit W of each instruction in reservation stations are compared with the index EX and the wrap bit WX (conditional block 304). In an embodiment where indexes are assigned in increasing fashion, instructions for which EX<I and W=WB, and instructions for which EX>I and WX≠W (Y branch of block 304) may be considered younger than the instruction executed with exception and may be flushed from the reservation stations (block 306). In a multi-threaded core 100, younger instructions may further be tested so that only instructions that belong to the same thread as the instruction executed with exception are flushed (block 306). No action is performed on instructions older than the instruction executed with exception (N branch of 304).

In an embodiment where indexes are assigned in decreasing fashion, instructions for which EX>I and W=WB, and instructions for which EX<I and WX≠W, may be flushed from the reservation stations.

Figure 4:
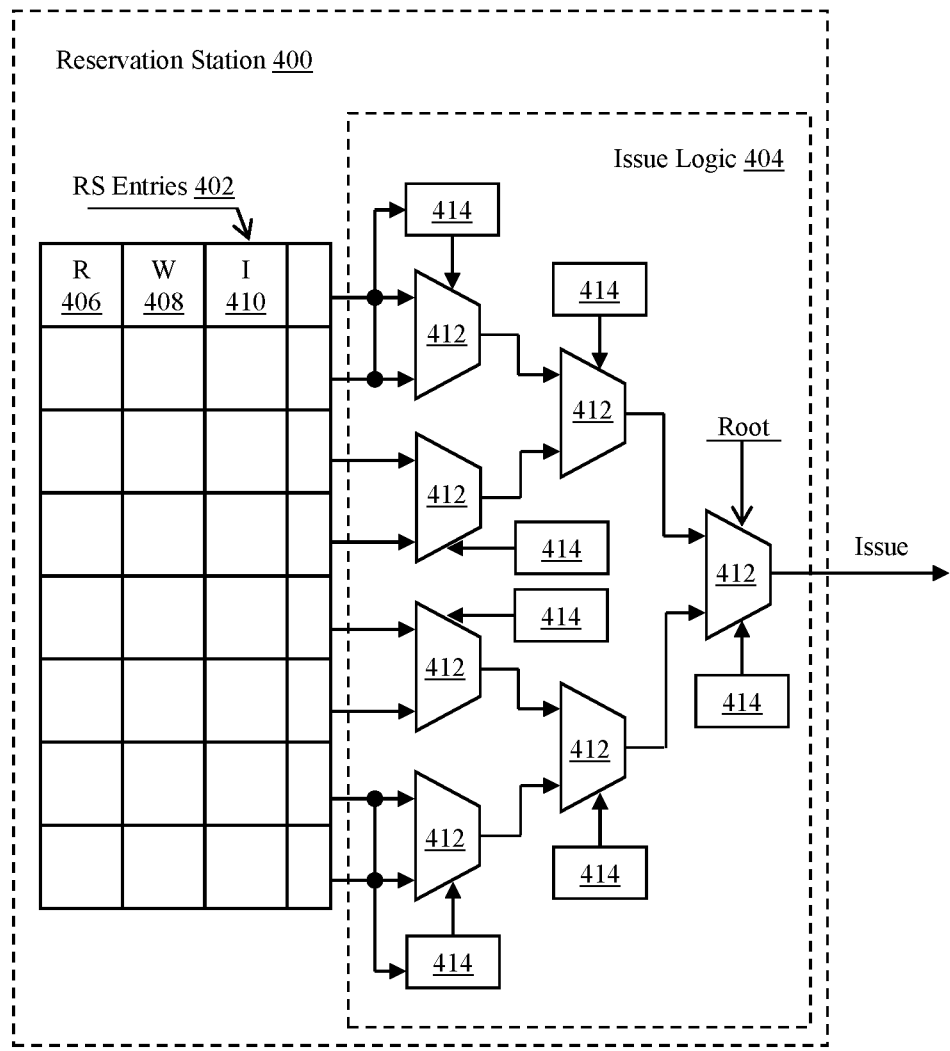
FIG. 4 shows an embodiment of issue logic.

Turning now to FIG. 4, an embodiment of issue logic is shown. A reservation station 400 comprising plurality of entries 402 is coupled to an issue logic 404. The issue logic 404 is configured to issue oldest ready instruction to the execution units 110. Instructions hosted in the entries 402 comprise ready-to-issue bit R 406, wrap bit W 408, and index I 410. The R bit 406 of an instruction indicates if the instruction may be issued to the execution units 110, i.e. the instruction is valid, instruction's source operands are ready, no data dependencies through memory exist, etc. A modulo counter 114 may be configured to assign integers to instructions, which may be considered as concatenation of wrap bit W 408 and index I 410. The wrap bit W 408 is alias for the most significant bit of the assigned integers, while the index I 410 is alias for the remaining bits of the assigned integers. The modulo counter 114 may be configured to assign B-bit integers to instructions. In one embodiment, $B \geq \lceil \log_2(2M) \rceil$, where M is the max number of instructions that may enter the reservation station 400 while an instruction is waiting to be issued. In another embodiment, $B > \lceil \log_2(2N) \rceil$, where N is the size of the instruction window.

Given two instructions from one thread, instruction that precedes in program order is considered older. Given two instructions from different threads, instruction that entered the reservation stations first is considered older. The issue logic 404 is configured to identify and select older ready instruction in a pair of instructions. If both instructions in a pair of instructions are ready to be issued, then the older instruction is selected as older ready. If only one instruction in a pair of instructions is ready to be issued, then the ready instruction is selected as older ready. If both instructions in a pair of instructions are not ready to be issued, then the older ready instruction may be selected randomly. The issue logic 404 starts by grouping instructions in RS entries 402 in pairs and selecting older ready instruction from each pair. The issue logic 404 may keep pairing instructions and selecting older ready instructions until one instruction remains. The remaining instruction may be referred to as oldest ready instruction.

In one embodiment, the issue logic 404 may comprise plurality of multiplexers 412 coupled as binary tree. Multiplexers 412 may be coupled as internal vertices of the tree, while reservation station entries 402 may be coupled as leaves of the tree. Each multiplexer 412 may be coupled to receive two instructions and to forward older ready instruction. A selection control logic 414 may be coupled to each mux 412. A pair of instructions provided to a mux 412, may also be provided to a selection control logic 414. The selection control logic 414 may identify older ready instruction, and may provide signal to the coupled mux 412, which may forward the older ready instruction. The root of the binary tree may output oldest ready instruction. The oldest ready instruction may be issued to the execution units 110 if the instruction is ready to be issued.

Figure 5:
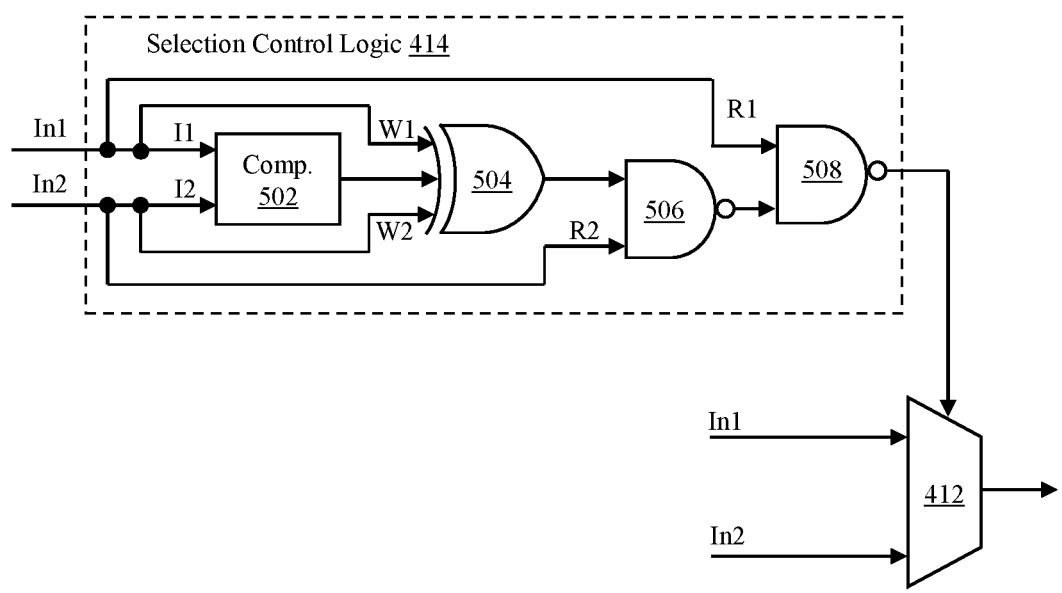
FIG. 5 shows an embodiment of a selection control logic.

Referring now to FIG. 5, an embodiment of a selection control logic is shown. The selection control logic 414 is coupled to receive ready-to-issue bit R1, wrap bit W1, and index I1 of a first instruction In1, and ready-to-issue bit R2, wrap bit W2, and index I2 of a second instruction In2. Both instructions are provided to a mux 412, which is part of the issue logic 404. The selection control logic 414 comprises a comparator 502, an XOR gate 504, and NAND gates 506, 508. Those of ordinary skill in the art will appreciate that the hardware may vary depending on the implementation. The selection control logic 414 may be configured to output logical 0—to direct the mux 412 to forward In1 as older ready, or logical 1—to direct the mux 412 to forward In2 as older ready.

If In1 is not ready to be issued (R1=0), the NAND gate 508 outputs 1, which directs the mux 412 to forward In2. If In1 is ready to be issued (R1=1), but In2 is not ready to be issued (R2=0), the NAND gate 506 outputs 1, which triggers the NAND gate 508 to output 0, which directs the mux 412 to forward In1. If In1 and In2 are ready to be issued (R1=R2=1), the output of the NAND gate 508 follows the output of the XOR gate 504. The XOR gate 504 is coupled to receive wrap bits W1, W2, and the output from the comparator 502. If W1=W2, the XOR gate 504 forwards the output of the comparator 502. If W1≠W2, the XOR gate 504 complements of the output of the comparator 502.

In an embodiment where integers are assigned in increasing fashion, the comparator 502 may be configured to output logical 0 if I1<I2, or logical 1 otherwise. If W1=W2 and I1<I2, the comparator 502, the XOR gate 504, and the NAND gate 508 output 0, which directs the mux 412 to forward In1. If W1≠W2 and I1>I2, the comparator 502 outputs 1, the XOR gate 504, and the NAND gate 508 output 0, which directs the mux 412 to forward In1. If W1=W2 and I2<I1, the comparator 502, the XOR gate 504, and the NAND gate 508 output 1, which directs the mux 412 to forward In2. If W1≠W2 and I2>I1, the comparator 502 outputs 0, XOR gate 504 and NAND gate 508 output 1, which directs the mux 412 to forward In2.

In an embodiment where integers are assigned in decreasing fashion, the comparator 502 may be configured to output logical 0 if I2<I1, or logical 1 otherwise.

Figure 6:
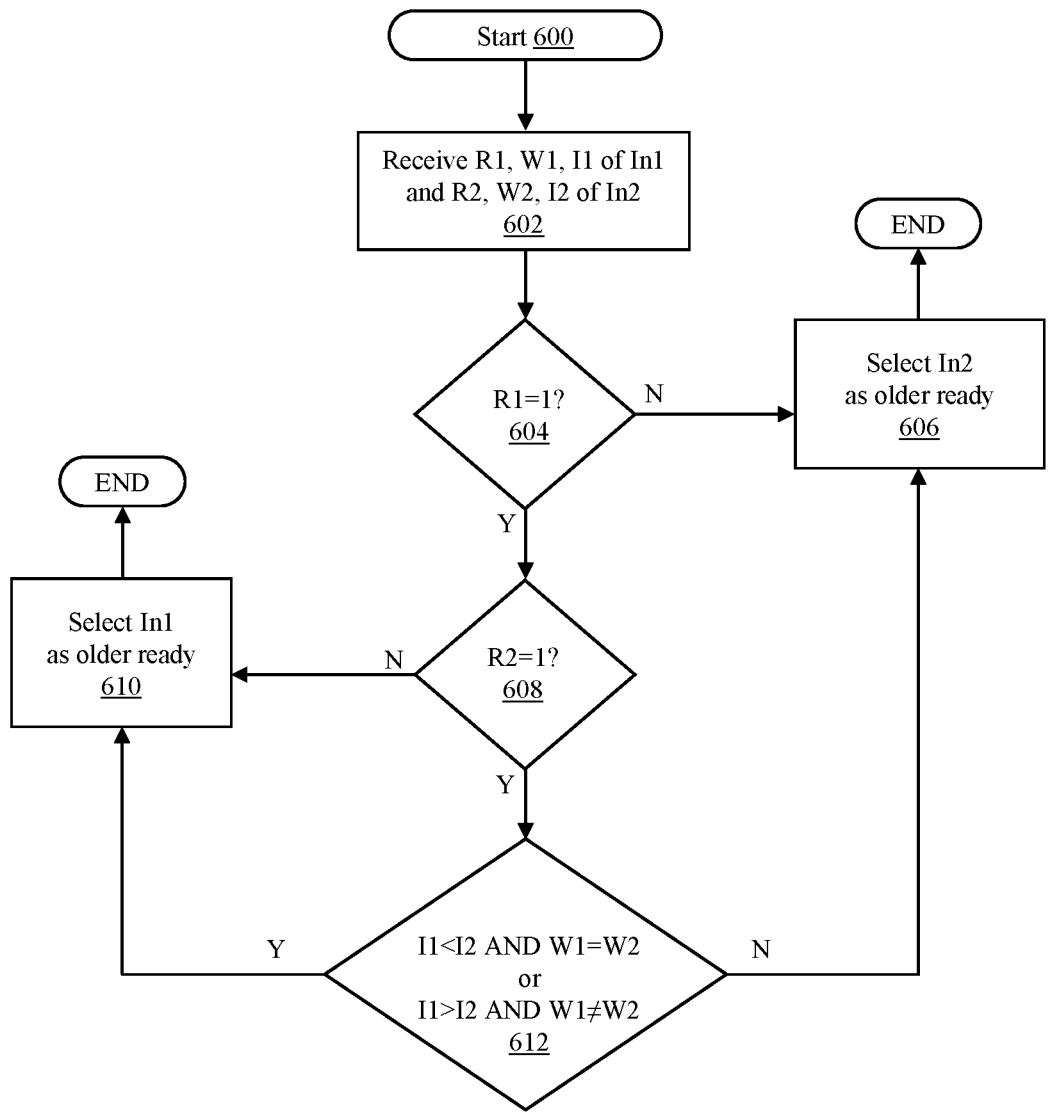
FIG. 6 shows a method for selecting older ready instruction.

Turning now to FIG. 6, a method for selecting older ready instruction is shown. Ready-to-issue bits R1, R2, wrap bits W1, W2, and indexes I1, I2 of two instructions In1 and In2 are provided to an instance of the method for selecting older ready instruction 600 (block 602). The method 600 tests ready-to-issue bit R1 to determine if In1 is ready to be issued (R1=1) (conditional block 604). If In1 is not ready to be issued (R1=0) (N branch of block 604), In2 is selected as older ready (block 606).

If In1 is ready to be issued (R1=1) (Y branch of block 604), the method 600 tests ready-to-issue bit R2 to determine if In2 is ready to be issued (R2=1) (conditional block 608). If In2 is not ready to be issued (R2=0) (N branch of block 608), In1 is selected as older ready (block 610). If In2 is ready to be issued (R2=1) (Y branch of block 608), the method 600 compares wrap bits W1, W2 and indexes I1, I2 (conditional block 612).

In an embodiment where integers are assigned in increasing fashion, if W1=W2 and I1<I2 or if W1≠W2 and I1>I2 (Y branch of block 612), the method 600 selects In1 as older ready (block 610). If W1=W2 and I2<I1 or if W1≠W2 and I2>I1 (N branch of block 612), the method 600 selects In2 as older ready (block 606).

In an embodiment where integers are assigned in decreasing fashion, if W1=W2 and I1<I2 or if W1≠W2 and I1>I2, the method 600 may select In2 as older ready. If W1=W2 and I2<I1 or if W1≠W2 and I2>I1, the method 600 may select In1 as older ready.

Figure 7:
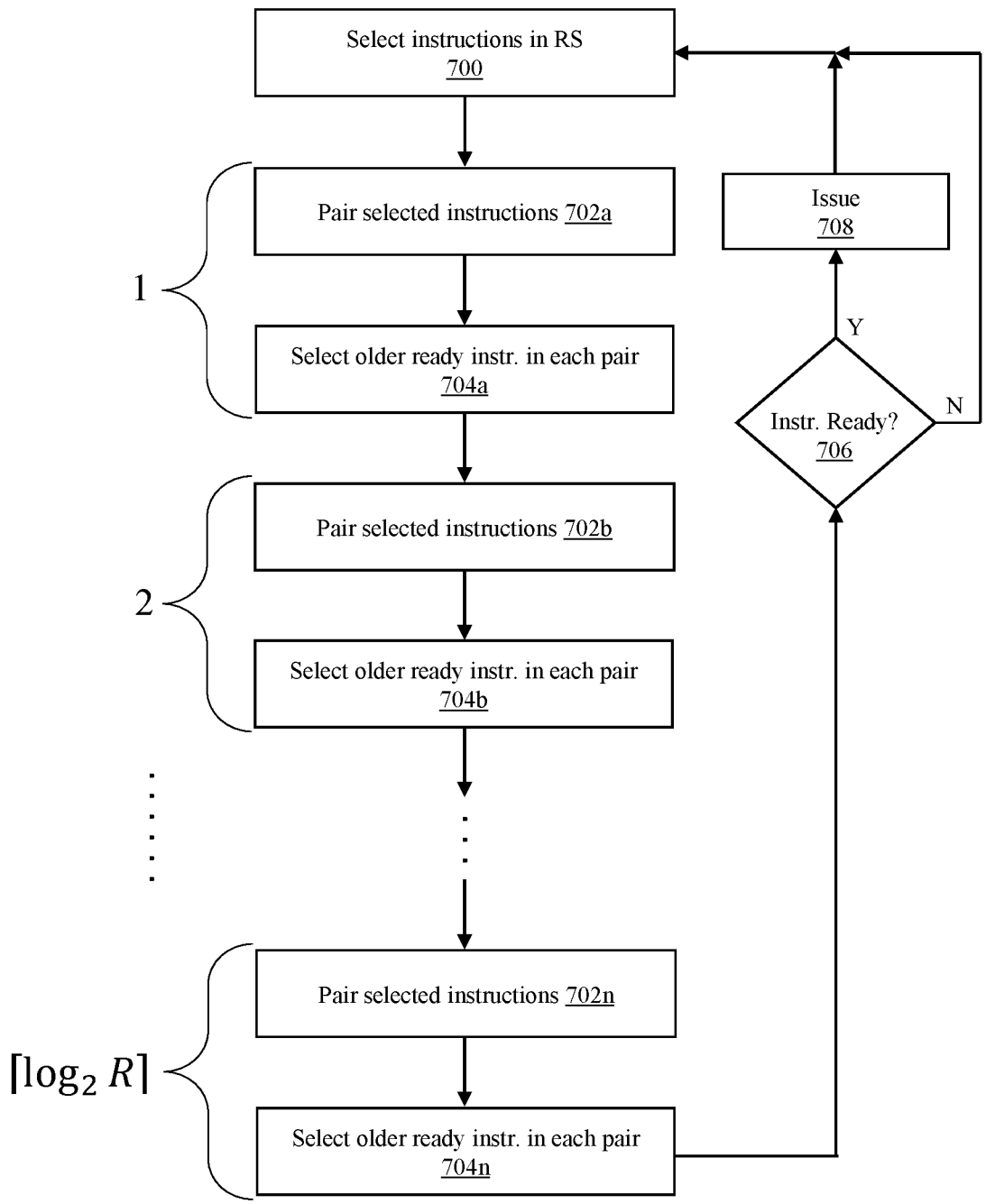
FIG. 7 shows a method for issuing oldest ready instruction.

Turning now to FIG. 7, a method for issuing oldest ready instruction is shown. The method for issuing oldest ready instructions starts by selecting instructions in a reservation station (block 700).

Selected instructions are grouped in disjoint pairs (block 702a). Each pair of instructions is provided to an instance of the method 600 to select older ready instruction (block 704a).

Selected instructions are grouped in disjoint pairs (block 702b). Each pair of instructions is provided to an instance of method 600 to select older ready instruction (block 704b).

In one embodiment, pairing blocks 702a-n and selection blocks 704a-n may be repeated in alternating fashion as long as there are more than one selected instructions. In another embodiment, pairing blocks 702a-n and selection blocks 704a-n may be repeated in alternating fashion $\lceil \log_2 R \rceil$ times, where R is the number of reservation station entries. After $\lceil \log_2 R \rceil$ alternating repetitions of blocks 702a-n and 704a-n one instruction remains selected. Selected instruction may be referred to as oldest ready. The oldest ready instruction is tested if it is ready to be issued (conditional block 706). If the oldest ready instruction is not ready to be issued (N branch of block 706), a new instance of the method for issuing oldest ready instructions is started by considering instructions in the reservation station as selected (block 700). If the oldest ready instruction is ready to be issued (Y branch of block 706), the oldest ready instruction is issued to execution units (block 708) and a new instance of the method for issuing oldest ready instructions is started by considering instructions in the reservation station as selected (block 700).

Figure 8:
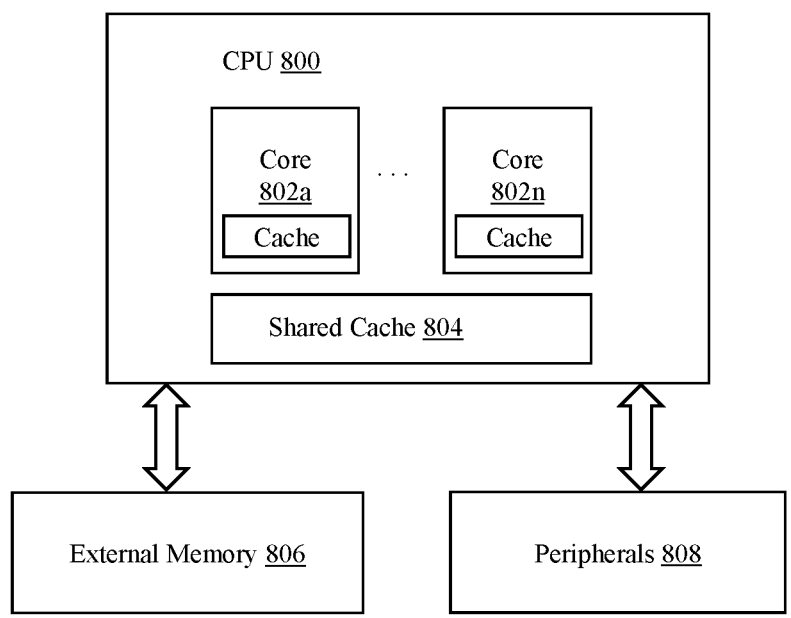
FIG. 8 shows an embodiment of a central processing unit in accordance with the embodiments of the present invention.

Referring now to FIG. 8, an embodiment of a central processing unit in accordance with the embodiments of the present invention is shown. It should be obvious to those skilled in the art that the central processing unit (CPU) 800 may be embodied as a hardware, software, combination of hardware and software, or computer program product, stored on a non-transitory storage media and later used to fabricate hardware comprising the embodiments described herein. The central processing unit 800 may be part of a desktop computer, server, laptop computer, tablet computer, cell or mobile phone, wearable device, special purpose computer, etc. The central processing unit 800 may be included within a system on a chip or integrated circuit, coupled to external memory 806 and peripheral units 808. The CPU 800 may include one or more instances of core processors 802a-n, shared cache 804, interface units, power supply unit, etc. At least one of the core processors 802a-n may include the embodiments described herein. External memory 806 may be any type of memory, such as dynamic random-access memory (DRAM), static random-access memory (SRAM), etc. In some systems, more than one instance of central processing units 800 and/or external memory 808 may be used on one or more integrated circuits. The peripheral unit 808 may include various types of communication interfaces, display, keyboard, etc.

I claim:

1. A method for flushing instructions from a plurality of instructions stored in a reservation station in a processor responsive to a first instruction of the plurality of instructions executed with an exception, the method comprising:
   comparing a first index with a second index to determine if the first index is smaller than the second index, wherein the first instruction is stored in the reservation station with a first wrap bit and the first index, wherein the first wrap bit and the first index are assigned to the first instruction before the first instruction is stored in the reservation station, wherein a second instruction of the plurality of instructions is stored with a second wrap bit and the second index, wherein the second wrap bit and the second index are assigned to the second instruction before the second instruction is stored in the reservation station;
   calculating an exclusive-or operation over the first wrap bit, the second wrap bit, and a logical value that represents a result from comparing the first index with the second index;
   flushing from the reservation station the second instruction if the exclusive-or operation is equal to a predefined logical value.

2. The method in claim 1, wherein the plurality of instructions is from one or more threads, wherein the first instruction and the second instruction are from a same thread.

3. The method in claim 2, wherein the first index and the second index are $\lceil \log_2 (N) \rceil$-bit numbers, wherein N is a size of instruction window.

4. The method in claim 2, wherein the processor includes a reorder buffer comprising reorder buffer entries, wherein said reorder buffer entries are identified with reorder buffer indexes, wherein a first reorder buffer entry identified with a first reorder buffer index is allocated to the first instruction, wherein a second reorder buffer entry identified with a second reorder buffer index is allocated to the second instruction, wherein the first index corresponds to the first reorder buffer index, wherein the second index corresponds to the second reorder buffer index.

5. The method in claim 4, wherein the exclusive-or operation is equal to the predefined logical value if the first index is smaller than the second index and the first wrap bit is equal to the second wrap bit or if the first index is larger than the second index and the first wrap bit is not equal to the second wrap bit.

6. The method in claim 4, wherein the exclusive-or operation is equal to the predefined logical value if the first index is larger than the second index and the first wrap bit is equal to the second wrap bit or if the first index is smaller than the second index and the first wrap bit is not equal to the second wrap bit.

7. A processor comprising:
a reservation station configured to store instructions, wherein a first instruction of said instructions is stored with a first wrap bit and a first index, wherein the first wrap bit and the first index are assigned to the first instruction before the first instruction is stored in the reservation station, wherein a second instruction of said instructions is stored with a second wrap bit and a second index, wherein the second wrap bit and the second index are assigned to the second instruction before the second instruction is stored in the reservation station;
a circuit coupled to the reservation station, wherein in response to the first instruction executed with an exception, the circuit is configured to:
compare the first index with the second index to determine if the first index is smaller than the second index;
calculate an exclusive-or operation over the first wrap bit, the second wrap bit, and a logical value that represents a result from comparing the first index with the second index;
flush from the reservation station the second instruction if the exclusive-or operation is equal to a predefined logical value.

8. The processor in claim 7, wherein said instructions are from one or more threads, wherein the first instruction and the second instruction are in a same thread.

9. The processor in claim 8, wherein the first index and the second index are $[\log_2 (N)]$-bit integers, wherein N is a size of instruction window.

10. The processor in claim 8, wherein the processor includes a reorder buffer comprising reorder buffer entries, wherein said reorder buffer entries are identified with reorder buffer indexes, wherein a first reorder buffer entry identified with a first reorder buffer index is allocated to the first instruction, wherein a second reorder buffer entry identified with a second reorder buffer index is allocated to the second instruction, wherein the first index corresponds to the first reorder buffer index, wherein the second index corresponds to the second reorder buffer index.

11. The processor in claim 10, wherein the exclusive-or operation is equal to the predefined logical value if the first index is smaller than the second index and the first wrap bit is equal to the second wrap bit or if the first index is larger than the second index and the first wrap bit is not equal to the second wrap bit.

12. The processor in claim 10, wherein the exclusive-or operation is equal to the predefined logical value if the first index is larger than the second index and the first wrap bit is equal to the second wrap bit or if the first index is smaller than the second index and the first wrap bit is not equal to the second wrap bit.

13. A method for determining older ready instruction from instructions stored in a reservation station of a processor, the method comprising:
comparing a first index with a second index to determine if the first index is smaller than the second index, wherein a first wrap bit and the first index are stored in the reservation station with a first instruction of said instructions, wherein the first wrap bit and the first index are assigned to the first instruction before the first instruction is stored in the reservation station, wherein a second wrap bit and the second index are stored in the reservation station with a second instruction of said instructions, wherein the second wrap bit and the second index are assigned to the second instruction before the second instruction is stored in the reservation station; calculating an exclusive-or operation over the first wrap bit, the second wrap bit, and a logical value that represents a result from comparing the first index with the second index;
determining an older ready instruction, wherein the first instruction is determined to be the older ready instruction if a second ready bit indicates that the second instruction is not ready to be issued or if a first ready bit indicates that the first instruction is ready to be issued and the exclusive-or operation is equal to a predefined logical value, wherein if the first instruction is not determined to be the older ready instruction then the second instruction is determined to be the older ready instruction.

14. The method in claim 13, further comprising:
excluding from said instructions the first instruction if the second instruction is determined to be the older ready instruction;
excluding from said instructions the second instruction if the first instruction is determined to be the older ready instruction.

15. The method in claim 14, further comprising
repeating the comparing, calculating, determining, and excluding steps until a single instruction of said instructions remains not excluded.

16. The method in claim 15, wherein the repeating step is partitioned into a plurality of iterations, wherein the first instruction and the second instruction are used once in an iteration of the plurality of iterations, wherein at most one not excluded instruction of said instructions is not used in the iteration, wherein at most $[\log_2 R]$ iterations are performed, wherein R is a number of entries of the reservation station.

17. The method in claim 16, wherein the exclusive-or operation is equal to the predefined logical value if the first index is smaller than the second index and the first wrap bit is equal to the second wrap bit or if the first index is larger than the second index and the first wrap bit is not equal to the second wrap bit.

18. The method in claim 16, wherein the exclusive-or operation is equal to the predefined logical value if the first index is larger than the second index and the first wrap bit is equal to the second wrap bit or if the first index is smaller than the second index and the first wrap bit is not equal to the second wrap bit.

19. A processor comprising:
a reservation station configured to store instructions, wherein the reservation station comprises a plurality of reservation station entries, wherein an instruction of said instructions is stored in a reservation station entry with a wrap bit, an index, and a ready bit;

a circuit coupled to receive a first wrap bit, a first index, and a first ready bit stored in the reservation station with a first instruction of said instructions, wherein the circuit is coupled to receive a second wrap bit, a second index, and a second ready bit stored with a second instruction of said instructions, wherein the first wrap bit and the first index are assigned to the first instruction before the first instruction is stored in the reservation station, wherein the first ready bit indicates if the first instruction is ready to be issued, wherein the second wrap bit and the second index are assigned to the second instruction before the second instruction is stored in the reservation station, wherein the second ready bit indicates if the second instruction is ready to be issued, wherein the circuit is configured to:

compare the first index with the second index to determine if the first index is smaller than the second index;

calculate an exclusive-or operation over the first wrap bit, the second wrap bit, and a logical value that represents a result from comparing the first index with the second index;

assert a signal to indicate that the first instruction is older ready if the second ready bit indicates that the second instruction is not ready to be issued or if the exclusive-or operation is equal to a predefined logical value and the first ready bit indicates that the first instruction is ready to be issued, wherein not asserted signal indicates that the second instruction is older ready.

20. The processor in claim 19, wherein the circuit is further configured to:
output the first wrap bit, the first index, and the first ready bit if the signal is asserted;
output the second wrap bit, the second index, and the second ready bit if the signal is not asserted.

21. The processor in claim 20, further comprising a plurality of circuits coupled as a binary tree, wherein the plurality of circuits are coupled as internal vertices of the tree, wherein a first internal vertex is coupled to receive an output from a second internal vertex, wherein reservation station entries are coupled as leaves of the binary tree, wherein a third internal vertex is coupled to a fourth leaf to receive a fourth wrap bit, a fourth index, and a fourth ready bit stored with a fourth instruction in the fourth leaf.

22. The processor in claim 21, wherein the binary tree is balanced, wherein a height of the binary tree is $[\log_2 R]$, wherein R is a number of reservation station entries.

23. The processor in claim 22, wherein the exclusive-or operation is equal to the predefined logical value if the first index is smaller than the second index and the first wrap bit is equal to the second wrap bit or if the first index is larger than the second index and the first wrap bit is not equal to the second wrap bit.

24. The processor in claim 22, wherein the exclusive-or operation is equal to the predefined logical value if the first index is larger than the second index and the first wrap bit is equal to the second wrap bit or if the first index is smaller than the second index and the first wrap bit is not equal to the second wrap bit.

* * * * *